UNITED STATES PATENT OFFICE.

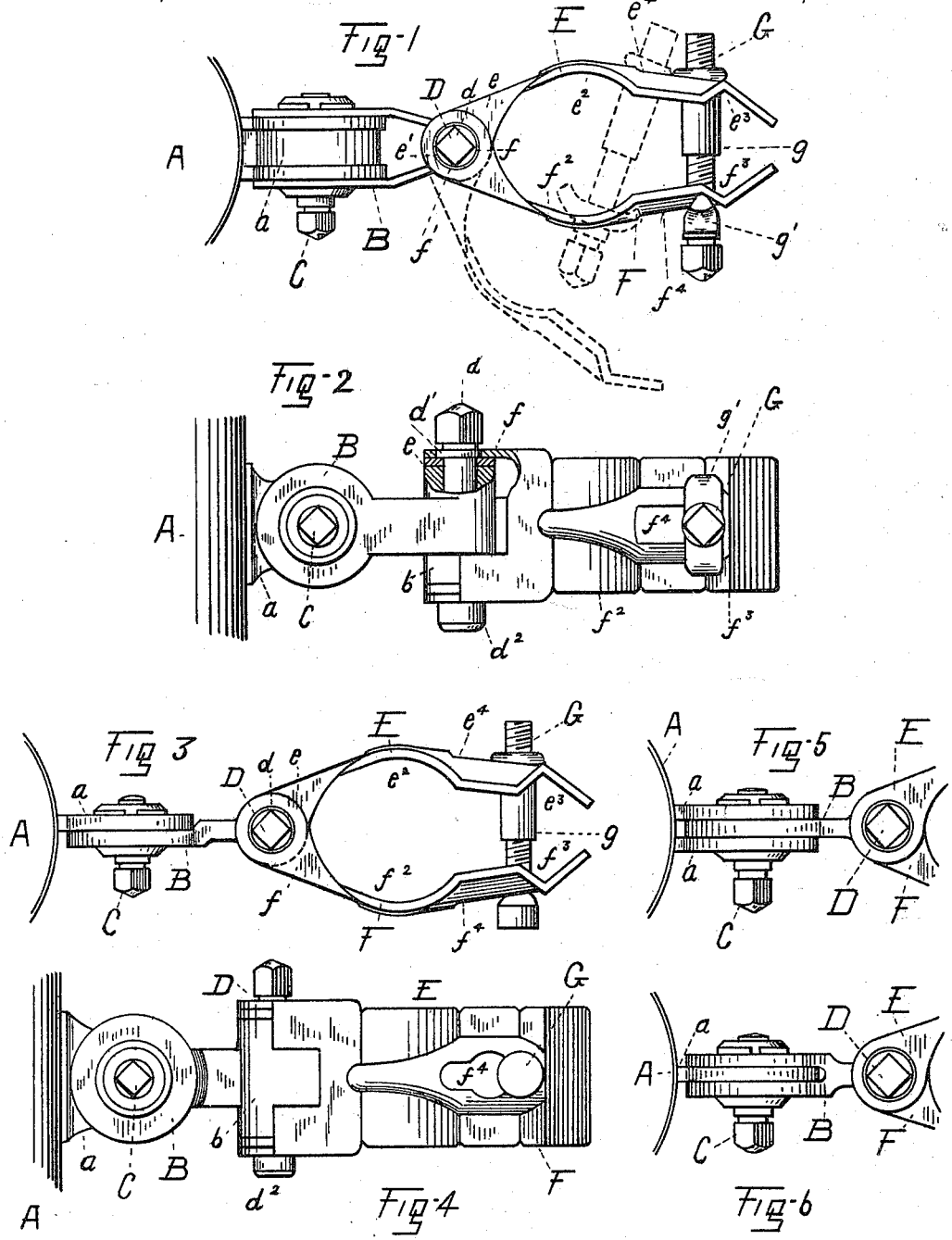

FRANK RHIND, OF BRIDGEPORT, CONNECTICUT, ASSIGNOR OF ONE-HALF TO THE BRIDGEPORT BRASS COMPANY, OF SAME PLACE.

LANTERN-BRACKET.

SPECIFICATION forming part of Letters Patent No. 585,406, dated June 29, 1897.

Application filed March 6, 1897. Serial No. 626,331. (No model.)

*To all whom it may concern:*

Be it known that I, FRANK RHIND, a citizen of the United States, residing at Bridgeport, Fairfield county, Connecticut, have invented a new and useful Improvement in Lantern-Brackets, of which the following is a specification.

My invention relates particularly to the brackets used to attach lanterns to bicycles and other vehicles, and is intended to facilitate their removal from and reattachment to a cycle stem or fork, a dashboard, or the like.

In the accompanying drawings, Figure 1 is a top plan view of a bracket embodying my invention. Fig. 2 is a side elevation of the same, partly broken away. Figs. 4 and 3, respectively, in side elevation and top plan show a modification. Figs. 5 and 6 are top plan views of other modifications.

The same letters refer to like parts in the several views.

A designates a lantern-body; $a$, a lug on said body; B, a hinge-plate provided with tubular portion $b$; C, a bolt; D, a second bolt provided with head $d$, swelled portion $d'$, and cylindric nut $d^2$; E, a clamp-jaw provided with bent portion $e$, apertures $e'$, depressions $e^2 e^3$, and slot $e^4$; F, a second clamp-jaw also provided with bent portion $f$, apertures $f'$, depressions $f^2 f^3$, and slot $f^4$; G, a bolt provided with nut $g$ and washer $g'$.

In the example of my invention illustrated in Figs. 1 and 2 of the drawings a small part only of the rear of the lantern-body A is shown. It suffices to show the attachment of the vertical lug $a$, to which the hinge-plate B is pivotally attached by means of the bolt C. The hinge-plate B, as shown, is bifurcate, having a substantially circular plate at each end, one at each side of the lug A, and a central tubular portion $b$, through which the bolt D passes. The bolt D is preferably formed with a polygonal head $d$ and an enlarged cylindric portion $d'$ above its body, and is fitted with a cylindric nut $d^2$.

It will be understood that the nut may be polygonal and the bolt-head cylindric, or that any well-known thumb-nut or the like may be substituted for the polygonal form shown.

The clamp-jaw E has two parallel bent portions $e$ in planes at right angles with its body. As shown, these bent portions or ears $e$ are pierced to fit snugly on the body of the bolt D and bear against the ends of the tubular portion $b$ of the hinge-plate B with considerable friction. The other clamp-jaw F has similar bent ears $f$, pierced to rotate freely on the enlarged portion $d'$ of the bolt D and on the nut $d^2$, respectively, and at a sufficient distance apart to inclose the ears $e$.

In the jaws E and F are coacting depressions $e^2$ and $f^2$, adapted to embrace the head or frame of a bicycle or the like, and other depressions $e^3$ and $f^3$ of angular form and designed to engage a bicycle-fork or like article. A bolt G passes through slots $e^4$ and $f^4$ in the jaws E and F and serves to draw them together. The slots $e^4$ and $f^4$ are elongated, as shown, which permits the bolt G to be moved lengthwise of the jaws E and F, so that either pair of depressions may be used. Below the preferably polygonal head of the bolt G is a washer $g'$, adapted, when turned to the position shown in dotted lines, Fig. 1, to pass through the slot $f^4$.

My present device is an improvement on that shown in United States Patent No. 559,951, granted May 12, 1896, on the application of myself and others. The operation of the present device so far as it is similar to that of the device described in that patent needs no description. It differs therefrom in that the jaw F is pivoted so as to swing freely while the other jaw E is held either by friction or by the tightening of the bolt D, which acts to press the ears $e$ firmly against the ends of the tubular portion $b$ of the hinge-plate B. This, in connection with the elongated slot $f^4$, through which the washer $g'$ passes, enables the jaw F to swing out, as indicated in dotted lines, Fig. 1, without changing the position or "set" of the jaw E and by only slightly loosening the nut $g$. This is of great convenience when it is desired to remove the lamp from the cycle, as for cleaning. A few turns of the bolt G permits the washer $g'$ to be rotated and the jaw F to be opened. When desired, the lamp may be returned to just its former position, the jaw E not having been moved relatively to the lamp.

It will be noted that the jaw F, although free as to rotation in relation to the hinge-plate B, remains securely attached thereto and is not liable to be accidentally removed or lost.

In Figs. 3 and 4 of the drawings the slot $f^4$ is shown as having an enlarged central portion through which the head of the bolt G may pass, the loose washer $g'$ being omitted. In this form either pair of depressions $e^2 f^2$ or $e^3 f^3$ may be used, the bolt being moved to the farther end of the slots in each case.

Figs. 5 and 6 of the drawings are intended to illustrate that my device may be used with any desired form of connection between the clamp-jaws and the lamp. It is usually advantageous, however, that this connection should include a vertical hinge, as shown, in order that the lamp may be set perpendicularly, whatever the rake of the frame or part clamped.

It is obvious that many mechanical alterations may be made without departing from my invention. I do not, therefore, hold myself limited to the particular form of construction shown.

What I claim as my invention, and desire to secure by Letters Patent of the United States, is as follows:

1. In a lantern-bracket in combination, a pair of opposed clamp-jaws, a tubular portion with which said jaws are pivotally connected, ears in said jaws embracing said tubular portion and a bolt passing through said ears and said tubular portion and adapted to detachably secure one of said jaws to said tubular portion the other of said jaws being relatively free as to rotary movement, substantially as described.

2. In a lantern-bracket, in combination, a pair of opposed clamp-jaws, a tubular portion with which said jaws are pivotally connected, ears on said jaws embracing said tubular portion and a bolt passing through said ears and through said tubular portion and adapted to press the ears of one of said jaws against the ends of said tubular portion, the other of said jaws being relatively free as to rotation in respect to said tubular portion, substantially as described.

3. In a lantern-bracket in combination, a pair of opposed clamp-jaws each provided with two dissimilar depressions, each pair of depressions adapted to engage a different portion of a cycle or the like, longitudinal slots in each of said jaws and a clamping-bolt in said slots and adapted to move lengthwise of said jaws, substantially as described.

4. In a lantern-bracket in combination, a pair of opposed rigid clamp-jaws, an elongated or non-cylindric slot in one of said jaws, a clamping-bolt and a loose portion on said bolt adapted to pass said aperture when turned lengthwise thereof and by rotation to engage said jaw at the side of said aperture, substantially as described.

FRANK RHIND.

Witnesses:
GEO. L. COOPER,
F. J. KINGSBURY, Jr.